United States Patent [19]

Miyazaki et al.

[11] Patent Number: 5,066,682
[45] Date of Patent: Nov. 19, 1991

[54] PROCESS FOR PREPARING AN ION EXCHANGE MEMBRANE

[75] Inventors: Makoto Miyazaki, Iwaki; Tatsuo Hiyoshi, Yokohama, both of Japan

[73] Assignee: Asahi Kasei Kogyo Kabushiki Kaisha, Osaka, Japan

[21] Appl. No.: 533,400

[22] Filed: Jun. 5, 1990

[30] Foreign Application Priority Data

Jun. 5, 1989 [JP] Japan .................................. 1-140987

[51] Int. Cl.$^5$ .................................................. C08J 5/20
[52] U.S. Cl. ........................................ 521/27; 521/30; 521/31; 525/353; 525/368; 525/369; 204/98; 204/252; 204/296
[58] Field of Search .................... 204/296; 521/25, 27, 521/30, 31, 39; 429/30, 33, 46; 525/353, 368, 369

[56] References Cited

U.S. PATENT DOCUMENTS

| | | | |
|---|---|---|---|
| 4,341,605 | 7/1982 | Solenberger et al. | 204/98 |
| 4,486,227 | 12/1984 | Douchy et al. | 75/53 |
| 4,626,553 | 12/1986 | Hane et al. | 156/309.3 |
| 4,900,408 | 2/1990 | Powers | 204/296 |
| 4,904,701 | 2/1990 | Hiyoshi et al. | 521/32 |

FOREIGN PATENT DOCUMENTS

| | | |
|---|---|---|
| 0167885 | 1/1986 | European Pat. Off. . |
| 58-65727 | 4/1983 | Japan . |
| 61-19638 | 1/1986 | Japan . |
| 2091166 | 7/1982 | United Kingdom . |

*Primary Examiner*—T. Tung
*Assistant Examiner*—Kathryn Gorgas
*Attorney, Agent, or Firm*—Birch, Stewart, Kolasch & Birch

[57] ABSTRACT

A novel process is disclosed in which a membrane of a fluorinated resin containing a pendant precursor ion exchange group represented by the formula:

$$-SO_2X$$

wherein X rerpesents a halogen atom, is contacted with a aqueous solution containing specific amounts of at least one alkali metal or alkaline earth metal hydroxide and at least one specific water soluble organic compound to thereby hydrolyze the precursor group while causing a specific membrane volume increase. In the process of the present invention, since the ion exchange membrane is swelled, while being hydrolyzed, to a desired degree, the rate of hydrolysis of precursor ion exchange groups is high, so that a final ion exchange membrane is free of wrinkles formed during the hydrolysis step of a conventional process and during the electrolytic operation, thereby enabling the final membrane to ensure advantageously low cell voltage and stable, prolonged electrolytic operation.

19 Claims, No Drawings

PROCESS FOR PREPARING AN ION EXCHANGE MEMBRANE

BACKGROUND OF THE INVENTION

1. Field Of The Invention

The present invention relates to a process for preparing an ion exchange membrane which can advantageously be employed to separate the anode and cathode compartments of an electrolytic cell, especially a chlor-alkali electrolytic cell.

More particularly, the present invention is concerned with a process for preparing an ion exchange membrane in which a precursor membrane of a fluorinated resin containing a sulfonyl halide group as a precursor ion exchange group is contacted with an aqueous solution containing specific amounts of at least one alkali metal or alkaline earth metal hydroxide and at least one specific water soluble organic compound to thereby hydrolyze the precursor group while causing a specific volume increase of the membrane. The ion exchange membrane which can be obtained by the process of the present invention is free of the wrinkles formed during the hydrolysis step of a conventional process and during the electrolytic operation, so that the membrane can ensure advantageously low cell voltage and stable, prolonged electrolytic operation.

2. Discussion Of Related Art

The use of an ion exchange membrane of a fluorinated polymer having carboxylate and/or sulfonate ion exchange groups as a membrane for separating the anode and cathode compartments of an electrolytic cell, especially a chlor-alkali electrolytic cell, has been increasing year after year. In this field of application, it is desired that the ion exchange membrane exhibit low electrolytic cell voltage and high current efficiency, thereby enabling the electrolytic cell having the membrane incorporated therein to be stably operated with low electric power supply.

The above-mentioned ion exchange membrane of a fluorinated polymer having carboxylate and/or sulfonate ion exchange groups is conventionally manufactured by first molding into a film, a fluorinated polymer having precursor ion exchange groups and having thermoplastic properties, and then hydrolyzing the precursor ion exchange groups thereof to thereby form carboxylate and/or sulfonate ion exchange groups. The conventional processes for hydrolyzing the precursor ion exchange groups include a process comprising contacting the precursor groups with an aqueous solution of an alkali metal hydroxide. In this process, an aqueous solution having a relatively high temperature is preferably employed because it contributes toward an increase in the hydrolysis rate of the precursor ion exchange groups. With respect to this process, reference is made to, for example, Japanese Patent Application Laid-Open Specification No. 61-19638. According to the process of this reference, hydrolysis is conducted at a temperature of from 70° to 90° C. for 16 hours, using an aqueous solution containing sodium hydroxide in an amount of from 20 to 25% by weight, based on the weight of the solution.

The conventional processes for hydrolyzing the precursor ion exchange groups also include a process comprising contacting the precursor groups with a mixture of an aqueous solution of an alkali metal hydroxide and a water soluble organic solvent, such as dimethyl sulfoxide and an alcohol, e.g., methanol, ethanol or propanol. Such a mixture is used to swell the ion exchange membrane and accordingly increase the rate of hydrolysis of the precursor ion exchange groups. With respect to this process, reference is made to, for example, Japanese Patent Application Laid-Open Specification No. 57-139127. According to the process of this reference, hydrolysis is conducted at a temperature of 90° C. for 1 hour, using an aqueous solution containing from 11 to 13% by weight of potassium hydroxide and 30% by weight of dimethyl sulfoxide.

In the above-mentioned conventional process for hydrolyzing the precursor ion exchange groups in which use is made of an aqueous solution of an alkali metal hydroxide not containing a water soluble organic compound, the ion exchange membrane substantially does not swell at the hydrolysis step, and in this process, an extremely prolonged period of time is disadvantageously taken to complete the hydrolysis. In addition, it is noted that when electrolysis is conducted for a prolonged period of time using this ion exchange membrane, the ion exchange membrane is likely to swell, thereby forming disadvantageous wrinkles on the surface of the membrane. On the other hand, in the above-mentioned conventional process for hydrolyzing the precursor ion exchange groups in which use is made of a mixture of an aqueous solution of an alkali metal hydroxide and a water soluble organic solvent, it is likely that the ion exchange membrane is swelled to exhibit a marked volume increase, for example about 60% or more, during the hydrolysis, thereby forming wrinkles on the surface of the membrane. The wrinkle formation is likely to be accompanied by problems, such as cell voltage increase attributed to the retention of evolved gas and/or electrolyte by the wrinkles, and such as pinhole formation and membrane tearing attributed to the rubbing of the wrinkled membrane against an electrode. Further, when the wrinkles are formed during the hydrolysis, it is extremely difficult to remove them by post-treatment. As apparent from the above, all of these conventional processes have inherent drawbacks which limit their application.

SUMMARY OF THE INVENTION

With a view toward resolving the above-mentioned drawbacks of the prior art, the present inventors have made extensive and intensive studies on the actions and effects of a water soluble organic compound and an aqueous solution of an alkali, such as an alkali metal hydroxide or an alkaline earth metal hydroxide, exerted on a membrane containing sulfonyl halide groups as precursor groups at the time of the hydrolysis of the membrane. As a result, the present inventors have unexpectedly found that when a water soluble organic compound is not contained in an aqueous solution for hydrolysis, the degree of swelling of the ion exchange membrane during hydrolysis is decreased monotonously with an increase in the alkali concentration of the aqueous solution, and that, however, when a water soluble organic compound is present in an amount of, for example, 0.1% by weight or more in the aqueous solution for hydrolysis, the degree of swelling of the membrane is increased with an increase in the alkali concentration of the aqueous solution as long as the alkali concentration is in the range of from 15 to 50% by weight. It has also been found that although, in the co-presence of an alkali and a water soluble organic compound, both the degree of swelling and the rate of hydrolysis of the ion exchange membrane are increased monotonously with an increase in the concentration of the water soluble organic compound, the increase in the degree of swelling is large as compared to the increase in the rate of hydrolysis. Especially when the concentration of the water soluble organic compound is higher than 30% by weight, the increase in the degree of swelling of the membrane is extremely large as compared to the increase in the rate of hydrolysis, disadvantageously causing an unfavorably high degree of swelling of the membrane without sufficient hydrolysis of the precursor ion exchange groups. As a result of further intensive studies by the present inventors, it has been found that a high rate of hydrolysis while suppressing the swelling of the membrane to an appropriate degree can be attained by the use of an aqueous solution containing 15 to 50% by weight of an alkali and 0.1 to 30% by weight of a water soluble organic compound. Based on these unexpected findings, the present invention has been completed.

Accordingly, it is an object of the present invention to provide a novel process for preparing an ion exchange membrane by hydrolyzing precursor ion exchange groups of a precursor membrane (hereinafter frequently referred to simply as "membrane") of a fluorinated resin, in which the rate of hydrolysis of precursor ion exchange groups is high while controlling the swelling of the membrane to an appropriate degree, so that a final ion exchange membrane is free of the wrinkles inevitably formed during the hydrolysis step of a conventional process and during the electrolytic operation, thereby enabling the final ion exchange membrane to ensure advantageously low cell voltage and stable, prolonged electrolytic operation.

The foregoing and other objects, features and advantages of the present invention will be apparent from the following detailed description and appended claims.

DETAILED DESCRIPTION OF THE INVENTION

According to the present invention, a process for preparing an ion exchange membrane is provided which comprises the steps of:

(1) providing a membrane of a fluorinated resin containing a pendant precursor ion exchange group represented by the formula:

$$-SO_2X$$

wherein X represents a halogen atom, the membrane having an equivalent weight of from 600 to 1600 and a thickness of from 100 to 200 μm, and (2) contacting the membrane having the precursor group with an aqueous solution at a temperature of from 60° to 130° C. for a period of 20 minutes to 24 hours.

The aqueous solution contains at least one alkali metal or alkaline earth metal hydroxide and at least one water soluble organic compound selected from the group consisting of dimethyl sulfoxide, methanol, ethanol and propanol.

The proportions of the alkali metal or alkaline earth metal hydroxide and the water soluble organic compound in the aqueous solution are, respectively, in the range of from 15 to 50% by weight and in the range of from 0.1 to 30% by weight, based on the weight of the aqueous solution. Upon contacting the membrane having the precursor group with the aqueous solution, the precursor group of the formula $-SO_2X$ would be hydrolyzed to a sulfonate group while causing a membrane volume increase of from 10 to 55%. The membrane volume increase (AV) is defined by the following formula:

$$\Delta V = \frac{b - a}{a} \times 100 \, (\%)$$

wherein a represents the volume at 25° C. of the membrane having the precursor group before hydrolysis, and b represents the volume of the membrane after hydrolysis as measured in the aqueous solution at 25° C.

The fluorinated resin to be used in step (1) of the process of the present invention may be at least one copolymer obtained by reacting at least one fluorovinyl compound represented by the formula:

$$CF_2=CF(-O-CF_2CFL)_mO-(CF_2)_nSO_2X \quad (1)$$

wherein L represents a fluorine atom or a perfluoro alkyl group having 1 to 3 carbon atoms; m is an integer of 0 to 3, preferably 1 or 2; n is an integer of 1 to 3, preferably 2 or 3; and X represents a halogen atom, preferably a fluorine atom or a chlorine atom, with at least one fluorinated olefin represented by the formula:

$$CF_2=CFZ \quad (2)$$

wherein Z represents a hydrogen atom, a chlorine atom, a fluorine atom or a perfluoro alkyl group having 1 to 3 carbon atoms.

Preferred examples of fluorovinyl compounds of formula (1) include $$CF_2=CF-O-CF_2-\underset{\underset{CF_3}{|}}{CF}-O-CF_2CF_2-SO_2F \text{ and}$$

$$CF_2=CF-O-CF_2-\underset{\underset{CF_3}{|}}{CF}-O-CF_2CF_2CF_2-SO_2F.$$

Preferred examples of fluorinated olefins include tetrafluoroethylene.

The above-mentioned fluorinated resin from monomers of formula (1) and formula (2) may further comprise third monomer units. Examples of third monomer units include those from a monomer having a pendant precursor ion exchange group of formula $-COY$ wherein Y represents a fluorine atom, a chlorine atom or $-OR$ in which R represents an alkyl group having 1 to 3 carbon atoms, such as a methyl group, an ethyl group and a propyl group. The precursor group of formula $-COY$ is hydrolyzed to a carboxylate group in step (2).

The equivalent weight of the fluorinated resin membrane to be used in the present invention is appropriately selected according to the type and structure of the fluorovinyl compound employed. Generally, however, the equivalent weight of the fluorinated resin membrane is within the range of from 600 to 1600. When the equivalent weight is less than 600, the resultant membrane swells to an extreme extent in an electrolyte, so that the mechanical properties and electrochemical properties of the membrane become poor. On the other hand, when the equivalent weight is more than 1600, the electrical resistance of the resultant membrane is undesirably high.

In the present invention, it is preferred that the ratio of precursor group —SO₂X to the total of precursor groups —SO₂X and —COY corresponds to at least 20%, preferably at least 40%, of the above-mentioned equivalent weight of the ion exchange membrane which is in the range of from 600 to 1600.

The membrane of a fluorinated resin to be hydrolyzed in the present invention may have a single layer structure composed of a single type of copolymer. The membrane may also have a multi-layer structure composed of a plurality of layers of different copolymers, for example, two layers of different copolymers having different functional groups. For example, a membrane having a multi-layer structure comprising, as one of the layers, a layer containing a precursor group hydrolyzable to a carboxylate group can be used. An ion exchange membrane resulting from such a multi-layer membrane by the hydrolysis in step (2) of the process of the present invention has a layer containing a carboxylate group. When such an ion exchange membrane is disposed so as for this layer to face the cathode of an electrolytic cell, high current efficiency is advantageously attained in the electrolysis. Further, the multi-layer structure may be composed of two layers of copolymers having different equivalent weights for attaining the decreased cell voltage, or may be composed of two layers of copolymers each having at least two types of functional groups whose types and proportions are varied at every layer.

The thickness of the membrane of a fluorinated resin to be treated in the present invention is in the range of from 100 μm to 200 μm. When the thickness of the membrane is less than 100 μm, the mechanical properties of the membrane become poor, so that the membrane cannot be used on a commercial scale. On the other hand, when the thickness of the membrane is more than 200 μm, the cell voltage is disadvantageously increased.

For obtaining the effectiveness of the membrane of a fluorinated resin to be hydrolyzed in the present invention, the thickness of the layer having the functional group represented by the formula —SO₂X is advantageously 20% or more, preferably 40% or more, based on the total thickness of the membrane having the multi-layer structure.

A copolymer produced from a compound of formula (I) and a compound of formula (II), optionally together with a third monomer having a precursor group of formula —COY defined above, may be molded into a membrane using a press, rolls, an extruder or other conventional machines. The resultant membrane may be reinforced by a reinforcing material. The reinforcement of the membrane may be attained, for example, by encapsulating a reinforcing material in the membrane. The reinforcing material is preferably composed of a chemically inert perhalocarbon polymer, such as a tetrafluoroethylene homopolymer and a copolymer of tetrafluoroethylene and hexafluoropropylene and/or perfluorovinyl ether. The reinforcing material may take various forms. Generally, however, it is preferred that the reinforcing material be in the form of a woven fabric, e.g., a cloth or a net, a non-woven fabric or a porous article. Further, a stretched microporous polytetrafluoroethylene sheet as employed in U.K. Patent No. 2,091166 is also useful as a reinforcing material.

In step (2) of the process of the present invention, the membrane provided in step (1) as described above is contacted with an aqueous solution containing at least one alkali metal or alkaline earth metal hydroxide, and at least one water soluble organic compound selected from the group consisting of dimethyl sulfoxide, methanol, ethanol and propanol. As the alkali metal or alkaline earth metal hydroxide, KOH, NaOH or a mixture thereof can preferably be used. Most preferably used as the water soluble organic compound is dimethyl sulfoxide. By the contacting of the membrane with the aqueous solution, hydrolysis of the precursor group of formula —SO₂X to a sulfonate group is performed.

As mentioned hereinbefore, when a water soluble organic compound is not contained in an aqueous solution for hydrolysis, the degree of swelling during hydrolysis of the ion exchange membrane containing a sulfonyl halide group is decreased monotonously with an increase in the alkali concentration of the aqueous solution. However, when a water soluble organic compound is present in an amount of, for example, 0.1% by weight or more in the aqueous solution for hydrolysis, the degree of swelling of the membrane is increased with an increase in the alkali concentration of the aqueous solution as long as the alkali concentration of the aqueous solution is in the range of from 15 to 50% by weight. In this connection, it is noted that although, in the co-presence of an alkali and a water soluble organic compound, both the degree of swelling and the rate of hydrolysis of the ion exchange membrane are increased monotonously with an increase in the concentration of the water soluble organic compound, the increase in the degree of swelling is large as compared to the increase in the rate of hydrolysis. Especially when the concentration of the water soluble organic compound is higher than 30% by weight, the increase in the degree of swelling of the membrane is extremely large as compared to the increase in the rate of hydrolysis, disadvantageously causing an unfavorably high degree of swelling of the membrane without sufficient hydrolysis of the precursor ion exchange groups. For ensuring a high rate of hydrolysis while suppressing the swelling of the membrane to a desired degree, the proportion of the water soluble organic compound should be in the range of from 0.1 to 30% by weight, preferably in the range of from 1 to 25% by weight, based on the weight of the aqueous solution, and the proportion of the alkali metal or alkaline earth metal hydroxide is in the range of from 15 to 50% by weight, preferably in the range of from 20 to 45% by weight, based on the weight of the aqueous solution.

The membrane volume increase ($\Delta V$) and the rate of hydrolysis of the membrane vary depending on the temperature at which the hydrolysis is performed. In the process of the present invention, the hydrolysis of precursor ion exchange groups is generally carried out at a temperature of from 60° to 130° C., preferably from 60° to 100° C. When the hydrolysis is conducted at a temperature of lower than 60° C., a prolonged period of time is disadvantageously needed to complete the hydrolysis. On the other hand, when the hydrolysis is conducted at a temperature of higher than 130° C., the final ion exchange membrane is likely to suffer from decreases in mechanical strength attributed to extremely large swelling of the membrane and in selective permeability for cations. In the electrolysis using this membrane, the purity of produced alkali and the current efficiency are likely to be poor.

The period of time required for the hydrolysis of precursor ion exchange groups varies depending on the composition of the aqueous solution, the type of the water soluble organic compound and the temperature at which the hydrolysis is effected. Generally, however, it is in the range of from 20 minutes to 24 hours, preferably in the range of from 30 minutes to 3 hours.

In the present invention, the membrane volume increase ($\Delta V$) of the membrane is in the range of from 10 to 55%, preferably from 15 to 44%. When the membrane volume increase ($\Delta V$) is in the range of from 10 to 55%, the rate of hydrolysis of precursor ion exchange groups is high and the wrinkle formation due to the excess swelling of the membrane can be avoided. When the membrane volume increase ($\Delta V$) is larger than 55%, wrinkles are likely to be formed due to the excess swelling of the membrane, and this wrinkle formation is likely to be accompanied by problems, such as cell voltage increase attributed to the retention of evolved gas and/or electrolyte by the wrinkles and such as pinhole formation and membrane tearing attributed to the rubbing of the wrinkled membrane against an electrode. On the other hand, when the membrane volume increase ($\Delta V$) is smaller than 10%, the penetration of the aqueous solution for hydrolyzing precursor ion exchange groups into the internal portion of the membrane is not smooth, and therefore, a prolonged period of time is disadvantageously taken to complete the hydrolysis. Further, when the membrane volume increase ($\Delta V$) is smaller than 10%, the ion exchange membrane is likely to exhibit disadvantageously high electrolytic cell voltage.

Chlor-alkali electrolysis for the production of an alkali metal hydroxide using the cation exchange membrane prepared by the present process can be conducted in a divided cell as is conventionally employed. When such electrolysis is conducted at a current density of from 5 to 50 A/dm$^2$ and at a temperature of from 50° to 110° C., an alkali metal hydroxide can stably be produced in a concentration of from 10 to 45% by weight, at a current efficiency as high as 90% or more and at a low cell voltage for a prolonged period of time.

The reason why the ion exchange membrane produced by the process of the present invention advantageously exhibits low cell voltage and stable electrolytic performance in the cell has not yet been elucidated but is believed to be as follows.

The ion exchange membrane produced by the process of the present invention does not suffer from wrinkle formation during the hydrolysis step, and is swelled by the aqueous solution for hydrolysis to an appropriate degree such that the membrane volume increase ($\Delta V$) is in the range of from 10 to 55%. When the ion exchange membrane produced by the process of the present invention is contacted with the electrolyte in a cell, the membrane is tensed to an appropriate extent. Hence, no wrinkles are formed during electrolysis. These are considered to be major reasons for the advantages of the membrane produced by the process of the present invention, i.e., low cell voltage and avoidance of problems, such as pinhole formation.

In the process of the present invention, since the ion exchange membrane is swelled, while being hydrolyzed, to an appropriate degree such that the membrane volume increase ($\Delta V$) is in the range of from 10 to 55%, the rate of hydrolysis of precursor ion exchange groups is high, so that a final ion exchange membrane is free of the wrinkles formed during the hydrolysis step of a conventional process and during the electrolytic operation, thereby enabling the final membrane to ensure advantageously low cell voltage and stable, prolonged electrolytic operation.

DETAILED DESCRIPTION OF PREFERRED EMBODIMENTS

The present invention will now be described in more detail with reference to the following Examples and Comparative Examples, which should not be construed as limiting the scope of the present invention.

EXAMPLE 1

Film A of 1150 in equivalent weight and 25 $\mu$m in thickness comprising a copolymer of tetrafluoroethylene and methyl perfluoro(4,7-dioxa-5-methyl-8-nonenoate) and Film B of 1090 in equivalent weight and 102 $\mu$m in thickness comprising a copolymer of tetrafluoroethylene and methyl perfluoro(4,7-dioxa-5-methyl-8-nonanesulfonyl fluoride) are prepared. Further, reinforced membrane C having precursor ion exchange groups is prepared as follows. Film B is laminated onto film A by the application of heat to the films, thereby obtaining a two-layer laminated sheet. A plain woven fabric of polytetrafluoroethylene fibers of 200 denier and 18 mesh is encapsulated in the layer of film B of the laminated sheet, thereby obtaining reinforced membrane C having precursor ion exchange groups.

The above prepared film A, film B and reinforced membrane C are immersed in an aqueous solution containing 30% by weight of potassium hydroxide and 5% by weight of dimethyl sulfoxide at 95° C. for 2 hours to thereby effect the hydrolysis. The wrinkle formation in the membrane after hydrolysis is evaluated by measuring the groove depth ($\mu$m) of linear wrinkles across the reinforcing woven fabric by means of a universal surface morphology measuring instrument (model: Surfcom 60B, manufactured and sold by Tokyo Seimitsu K.K., Japan). Further, the evaluation of the wrinkles of the membrane after electrolysis is conducted in the same manner as mentioned above. After completion of the reaction, reinforced membrane C is taken out and examined. No wrinkles are observed. Then, the membrane is washed with water. A thin slice sample is cut off from the ion exchange membrane using a microtome, along the transverse cross section of the membrane. The sample is stained with an acidic aqueous solution of malachite green exhibiting a pH value of 2. The stained sample is observed through a microscope. As a result, it is found that the layer of film A and the layer of film B are stained in blue and yellow, respectively, thereby confirming that all the precursor ion exchange groups are hydrolyzed. Further, after completion of the hydrolysis, film B is taken out from the solution and the membrane volume increase ($\Delta V$) is determined. The membrane volume increase ($\Delta V$) is found to be 31%.

Then, the electrolytic performance of the obtained ion exchange membrane C is examined by the use of a compact brine electrolytic cell having a current flowing area of 10 cm $\times$ 10 cm, as follows. The cathode incorporated in the cell comprises a titanium substrate with ruthenium coated thereon. The anode incorporated in the cell comprises a nickel substrate having a nickel oxide coated thereon by the common plasma spray technique. The hydrolyzed ion exchange membrane is placed in the cell in a manner such that the layer of film A of the ion exchange membrane C faces the cathode. The concentration of the aqueous sodium chloride solution in the anode compartment is maintained at 3.5N, and the sodium hydroxide concentration of the solution in the cathode compartment is maintained at 30% by weight by feeding water thereto. Electrolysis is conducted at 90° C. at 40 A/dm$^2$ for 4 weeks. The results are shown in Table 1. After completion of the electrolysis, the ion exchange membrane is examined. No wrinkles are observed after the electrolysis.

EXAMPLE 2

The same film A, film B and reinforced membrane C, each having precursor ion exchange groups, as prepared in Example 1 are subjected to hydrolysis treatment at 90° C. for 3 hours using an aqueous solution containing 5% by weight of dimethyl sulfoxide and 15% by weight of potassium hydroxide. After completion of the hydrolysis, the ion exchange membrane C is examined. No wrinkles are observed after the hydrolysis. The ion exchange membrane C is taken out from the solution, then a thin slice sample is cut off from the ion exchange membrane, stained and observed through a microscope, in substantially the same manner as in Example 1. As a result, the completion of the hydrolysis of precursor ion exchange groups is confirmed. After completion of the hydrolysis, the membrane volume increase ($\Delta V$) of film B is found to be 17%. The electrolytic performance of the hydrolyzed ion exchange membrane C is measured in substantially the same manner as in Example 1. The results are shown in Table 1.

EXAMPLE 3

The same film A, film B and reinforced membrane C, each having precursor ion exchange groups, as prepared in Example 1 are subjected to hydrolysis treatment at 90° C. for 2 hours using an aqueous solution consisting of 10% by weight of dimethyl sulfoxide, 30% by weight of potassium hydroxide and 60% by weight of water. Then, the ion exchange membrane C is taken out and examined. No wrinkles are observed. The resultant membrane is subjected to a staining test in substantially the same manner as in Example 1, thereby confirming the completion of the hydrolysis. After completion of the hydrolysis, the membrane volume increase ($\Delta V$) of film B is found to be 52%. The thus obtained ion exchange membrane C is examined with respect to the electrolytic performance in substantially the same manner as in Example 1. The results are shown in Table 1.

EXAMPLE 4

The same film A, film B and reinforced membrane C, each having precursor ion exchange groups, as prepared in Example 1 are subjected to hydrolysis treatment at 90° C. for 2 hours using an aqueous solution consisting of 15% by weight of dimethyl sulfoxide, 20% by weight of potassium hydroxide and 65% by weight of water. Then, the ion exchange membrane C is taken out and examined. No wrinkles are observed. The resultant membrane is subjected to a staining testing in substantially the same manner as in Example 1, thereby confirming the completion of the hydrolysis. After completion of the hydrolysis, the membrane volume increase ($\Delta V$) of film B is found to be 44%. The thus obtained ion exchange membrane C is examined with respect to the electrolytic performance in substantially the same manner as in Example 1. The results are shown in Table 1.

EXAMPLE 5

The same film A, film B and reinforced membrane C, each having precursor ion exchange groups, as prepared in Example 1 are subjected to hydrolysis treatment at 90° C. for 2 hours using an aqueous solution consisting of 20% by weight of dimethyl sulfoxide, 15% by weight of potassium hydroxide and 65% by weight of water. Then, the ion exchange membrane C is taken out and examined. No wrinkles are observed. After completion of the hydrolysis, the membrane volume increase ($\Delta V$) of film B is found to be 49%. The thus obtained ion exchange membrane C is examined with respect to the electrolytic performance in substantially the same manner as in Example 1. The results are shown in Table 1.

COMPARATIVE EXAMPLE 1

The same film A, film B and reinforced membrane C, each having precursor ion exchange groups, as prepared in Example 1 are subjected to hydrolysis treatment at 90° C. for 3 hours using an aqueous solution consisting of 20% by weight of sodium hydroxide and 80% by weight of water. As a result, it is found that unstained portion remains in film B, and that hence the hydrolysis has not yet been completed. The membrane volume increase ($\Delta V$) is found to be 8%. Then, with respect to the above-hydrolyzed film A, film B and ion exchange membrane C, hydrolysis is further conducted under the same conditions as mentioned above for 45 hours. Then, the ion exchange membrane C is taken out and examined. No wrinkles are observed. The resultant membrane is subjected to a staining testing in substantially the same manner as in Example 1, thereby confirming the completion of the hydrolysis. After completion of the hydrolysis, the membrane volume increase ($\Delta V$) of film B is found to be 14%. The thus obtained ion exchange membrane C is examined with respect to the electrolytic performance in substantially the same manner as in Example 1. The results are shown in Table 1. When the ion exchange membrane C is examined after the electrolysis, linear wrinkles are observed over the entire surface of the electric flowing portion of the membrane. The groove depth of linear wrinkles is measured in the same manner as in Example 1. As a result, it is found to be 250 $\mu$m.

COMPARATIVE EXAMPLE 2

The same film A, film B and reinforced membrane C, each having precursor ion exchange groups, as prepared in Example 1 are subjected to hydrolysis treatment at 90° C. for 0.5 hour using an aqueous solution consisting of 30% by weight of dimethyl sulfoxide, 13% by weight of potassium hydroxide and 57% by weight of water. After completion of the hydrolysis, the ion exchange membrane C is taken out and examined. Linear wrinkles are observed, which start at the center of the membrane and run toward the circumference of the membrane. The groove depth of linear wrinkles is found to be 255 $\mu$m. The resultant membrane is subjected to a staining testing in substantially the same manner as in Example 1, thereby confirming the completion of the hydrolysis. After completion of the hydrolysis, the membrane volume increase ($\Delta V$) of film B is found to be 75%. The thus obtained ion exchange membrane C is examined with respect to the electrolytic performance in substantially the same manner as in Example 1. The results are shown in Table 1. When the ion exchange membrane C is examined after the electrolysis, linear wrinkles are observed, which start at the center of the membrane and run toward the circumference of the membrane. The groove depth of linear wrinkles is found to be 215 μm.

TABLE 1

| | Hydrolysis conditions | | | Membrane volume increase (ΔV) Film B (%) | Wrinkles after hydrolysis | Electrolytic performance | | Wrinkles after electrolysis |
|---|---|---|---|---|---|---|---|---|
| | Aqueous solution | Temperature (°C.) | Time (hr) | | | Current efficiency (%) | Cell voltage (V) | |
| Example 1 | dimethyl sulfoxide: 5% KOH: 30% water: 65% | 95 | 2 | 31 | none | 97 | 3.36 | none |
| Example 2 | dimethyl sulfoxide: 5% KOH: 15% water: 80% | 90 | 3 | 17 | none | 97 | 3.38 | none |
| Example 3 | dimethyl sulfoxide: 10% KOH: 30% water: 60% | 90 | 2 | 52 | none | 96 | 3.33 | none |
| Example 4 | dimethyl sulfoxide: 15% KOH: 20% water: 65% | 90 | 2 | 44 | none | 96 | 3.34 | none |
| Example 5 | dimethyl sulfoxide: 20% KOH: 15% water: 65% | 90 | 2 | 49 | none | 96 | 3.33 | none |
| Comparative Example 1 | NaOH: 20% water: 80% | 90 | 3 | 8 hydrolysis has not yet been completed | none | — | — | — |
| | " | " | 48 | 14 | none | 96 | 3.54 | 250 μm |
| Comparative Example 2 | dimethyl sulfoxide: 30% KOH: 13% water: 57% | 90 | 0.5 | 75 | 255 μm | 95 | 3.58 | 215 μm |

What is claimed is:

1. A process for preparing an ion exchange membrane comprising the steps of:
   (1) providing a membrane of a fluorinated resin containing a pendant precursor ion exchange group represented by the formula:

—SO$_2$X wherein X represents a halogen atom,
   said membrane having an equivalent weight of from 600 to 1600 and a thickness of from 100 to 200 μm, and
   (2) contacting said membrane having said precursor group with an aqueous solution at a temperature of from 60° to 130° C. for a period of from 20 minutes to 24 hours,
   said aqueous solution containing at least one alkali metal or alkaline earth metal hydroxide and at least one water soluble organic compound selected from the group consisting of dimethyl sulfoxide, methanol, ethanol and propanol,
   the proportions of the alkali metal or alkaline earth metal hydroxide and the water soluble organic compound in said aqueous solution being, respectively, in the range of from 15 to 50% by weight and in the range of from 0.1 to 30% by weight, based on the weight of said aqueous solution,
   thereby hydrolyzing said precursor group of formula —SO$_2$X to a sulfonate group while causing a membrane volume increase of from 10 to 55%,
   said membrane volume increase (ΔV) being defined by the following formula:

$$\Delta V = \frac{b - a}{a} \times 100 \ (\%)$$

wherein a represents the volume at 25° C. of the membrane having the precursor group before hydrolysis, and b represents the volume of the membrane after hydrolysis as measured in said aqueous solution at 25° C.

2. The process according to claim 1, wherein the proportion of the water soluble organic compound in said aqueous solution is in the range of from 1 to 25% by weight, based on the weight of said aqueous solution.

3. The process according to claim 1 or 2, wherein the water soluble organic compound is dimethyl sulfoxide.

4. The process according to claim 1, wherein said fluorinated resin provided in step (1) further contains a pendant precursor ion exchange group represented by the formula:

—COY wherein Y represents a fluorine atom, a chlorine atom or —OR in which R represents an alkyl group having 1 to 3 carbon atoms,
   said precursor group of formula —COY being hydrolyzed to a carboxylate group in step (2),
   and wherein the ratio of precursor group —SO$_2$X to the total of precursor groups —SO$_2$X and —COY corresponds to at least 20% of the equivalent weight of the ion exchange membrane.

5. The process according to claim 4, wherein the ratio of precursor group —SO$_2$X to the total of precursor groups —SO$_2$X and —COY corresponds to at least 40% of the equivalent weight of the ion exchange membrane.

6. The process according to claim 1, wherein the fluorinated resin of membrane (1) is at least one copolymer obtained by reacting at least one fluorovinyl compound represented by the formula:

$$CF_2\!=\!CF(-O-CF_2CFL)_mO-(CF_2)_nSO_2X \qquad (1)$$

wherein L represents a fluorine atom or a perfluoro alkyl group having 1 to 3 carbon atoms; m is an integer of 0 to 3; n is an integer of 1 to 3; and X represents a halogen atom, with at least one fluorinated olefin represented by the formula:

$$CF_2\!=\!CFZ \qquad (2)$$

wherein Z represents a hydrogen atom, a chlorine atom, a fluorine atom or a perfluoro alkyl group having 1 to 3 carbon atoms.

7. The process according to claim 6, wherein m of formula (1) is an integer 1 or 2, and n of formula (1) is an integer of 2 or 3.

8. The process according to claim 6, wherein the fluorovinyl compound of formula (1) is represented by:

$$CF_2\!=\!CF-O-CF_2-\underset{\underset{CF_3}{|}}{CF}-O-CF_2CF_2-SO_2F$$

or $$CF_2\!=\!CF-O-CF_2-\underset{\underset{CF_3}{|}}{CF}-O-CF_2CF_2CF_2-SO_2F.$$

9. The process according to claim 6, wherein the fluorinated olefin of formula (2) is tetrafluoroethylene.

10. The process according to claim 1, wherein the membrane further comprises a reinforcing material encapsulated therein.

11. The process according to claim 10, wherein the reinforcing material is a chemically inert perhalocarbon polymer.

12. The process according to claim 11, wherein the chemically inert perhalocarbon polymer is a homopolymer of tetrafluoroethylene, a copolymer of tetrafluoroethylene and hexafluoroethylene, perfluorovinyl ether or a mixture thereof.

13. The process according to claim 10, wherein the reinforcing material is in the form of a woven fabric, a non-woven fabric or a porous article.

14. The process according to claim 10, wherein the reinforcing material is in the form of a stretched microporous polytetrafluoroethylene sheet.

15. The process according to claim 1, wherein the alkali metal or alkaline earth metal hydroxide of the aqueous solution is KOH, NaOH or a mixture thereof.

16. The process according to claim 1, wherein the alkali metal or alkaline earth metal hydroxide and the water soluble organic compound is in the range of 20 to 45% by weight.

17. The process according to claim 1, wherein the contacting temperature is from 60° to 100° C.

18. The process according to claim 1, wherein the contacting of step (2) is for a period of 30 minutes to 3 hours.

19. The process according to claim 1, wherein said membrane volume increase is from 15 to 44%.

* * * * *